United States Patent [19]

Nelson

[11] Patent Number: 4,529,580

[45] Date of Patent: Jul. 16, 1985

[54] ALKALI METAL ALUMINUM HYDRIDE PRODUCTION

[75] Inventor: Gunner E. Nelson, Baton Rouge, La.

[73] Assignee: Ethyl Corporation, Richmond, Va.

[21] Appl. No.: 496,466

[22] Filed: May 20, 1983

Related U.S. Application Data

[63] Continuation of Ser. No. 450,032, Dec. 15, 1982.

[51] Int. Cl.$^3$ .............................................. C01B 6/24
[52] U.S. Cl. .................................................... 423/644
[58] Field of Search ....................................... 423/644

[56] References Cited

U.S. PATENT DOCUMENTS

| | | | |
|---|---|---|---|
| 3,104,252 | 9/1963 | Rodd et al. | 260/448 |
| 3,138,433 | 6/1964 | Guidice | 423/644 |
| 3,210,150 | 10/1965 | Powers | 423/644 |
| 3,387,933 | 6/1968 | Snyder | 423/644 |
| 3,387,949 | 6/1968 | Snyder | 423/644 |
| 3,505,036 | 4/1970 | Lindsay | 423/644 |
| 3,556,740 | 1/1971 | Murib | 23/365 |
| 4,045,545 | 8/1977 | Ashby | 423/644 |
| 4,081,524 | 3/1978 | Ashby | 423/644 |

FOREIGN PATENT DOCUMENTS

| | | | |
|---|---|---|---|
| 1084700 | 7/1960 | Fed. Rep. of Germany | 423/644 |
| 1105167 | 3/1968 | United Kingdom | 423/644 |
| 1185707 | 3/1970 | United Kingdom | 423/644 |
| 186983 | 10/1966 | U.S.S.R. | 423/644 |

OTHER PUBLICATIONS

Ashby, E. D., et al., Inorganic Chemistry, 2, 499 (1963), pp. 499–504.
Socha, A. J., et al., Analysis of Aluminum Powder (1964), pp. 1–5, and pp. i–vi.
Alcoa Atomized Powders (1968).
Alcoa Aluminum Powder (1969).
Zakharkin et al., "Acad. of Sciences, USSR, Proceedings", vol. 145, Aug. 1962, pp. 656–658.
Ashby et al., "Inorg. Chim.", vol.2, No. 3, Jun. 1963, pp. 499–504.

*Primary Examiner*—H. T. Carter
*Attorney, Agent, or Firm*—Donald L. Johnson; John F. Sieberth; John F. Hunt

[57] ABSTRACT

A process for the production of alkali metal aluminum tetrahydrides from aluminum and alkali metal. The reactants, preferably in stoichiometric proportions, are pressure hydrogenated in an ether reaction medium in the presence of an aluminum-containing catalyst.

15 Claims, No Drawings

ALKALI METAL ALUMINUM HYDRIDE PRODUCTION

CROSS-REFERENCE

This application is a continuation of U.S. patent application Ser. No. 450,032, filed Dec. 15, 1982.

BACKGROUND OF THE INVENTION

I. Field of the Invention

This invention relates in general to complex metal hydrides and their synthesis and, in particular, to an economical and highly advantageous stoichiometric process for production of alkali metal aluminum tetrahydrides.

II. Description of the Prior Art

The alkali metal aluminum hydrides have been made in the past by various techniques which have not proven to be economical for one reason or another. Various processes have been proposed for making alkali metal aluminum hydrides in both hydrocarbon and other solvents from alkali metal hydrides and from the elements. Such processes required extremely long reaction times (10–20 hours). Thus, there exists a need for a process to efficiently produce alkali metal aluminum hydrides, especially the tetrahydrides.

The tetrahydrides find use in reaction with various silicon-containing compounds to produce high purity silicon as a product of commerce primarily for semiconductor use. Of course, the alkali metal tetrahydrides have been used for other purposes as well. The worldwide production of sodium aluminum tetrahydride is quite low and I know of only one major producer.

Various metal catalysts have been used in the past for reaction promotion. These metals include titanium, scandium, and others. However, their use was suggested only for promotion of reactions to prepare organoaluminums. Many commercially available aluminums contain a trace amount of titanium, usually about 10 to 100 ppm on a weight basis. Other aluminums with high titanium (or similar metal) content are available but are not usually considered for chemical synthesis because of contamination.

In U.S. Pat. No. 4,081,524, Ashby disclosed the pressure hydrogenation of an alkali metal (sodium) with aluminum in the presence of a metal alkyl such as triethylaluminum. However, the shortest total reaction time reported for metal reactants was about 4.75 hours even at the extreme reaction conditions of 5000 psi and 160° C.

Reference is made to related co-pending application Ser. No. 457,897, filed Jan. 14, 1983, in my name, and co-pending application Ser. No. 496,474 filed May 20, 1983 in the name of M. F. Gautreaux. Those two applications and this application are commonly assigned. This application is also related to my co-pening U.S. Application Ser. No. 490,791, filed May 2, 1983.

SUMMARY OF THE INVENTION

The present invention is directed to an advantageous process for the provision of alkali metal aluminum tetrahydrides. The reaction is particularly characterized by the use of an aluminum containing a reaction-promoting quantity of certain metals. The invention provides the advantage of very good per batch yields at reaction rates not previously achieved. Thus, a cyclic or semi-continuous process offers particular advantages and is a preferred delineation of the invention.

The inventive process is initially catalyzed by an alkali metal aluminate. Advantageously, an aluminate species is carried forward in a reaction heel of liquid reaction medium for catalysis of subsequent cyclic production of alkali metal aluminum tetrahydrides. A stoichiometric excess of aluminum on sodium is normally preferred to assure an adequate supply of aluminum not only for reaction but, also, for the preferred in situ formation of alkali metal aluminate. The reaction is particularly characterized by the use of $NaAlCl_4$, to provide an aluminate, regardless of the reactant aluminum species used.

In one preferred embodiment, however, approximately stoichiometric portions of alkali metal and aluminum are used in an ether solvent. The reaction mixture may then be immediately filtered after hydrogenation in the presence of a catalyst. This obviates the decantation period where an aluminum containing heel or cake is settled out and permits immediate subsequent processing of the mixture.

Advantageously, a ball mill reactor or similar high shear apparatus is not required to carry out the inventive process, as is the case with certain prior art processes.

The present invention is broadly a process for the production of an alkali metal aluminum tetrahydride comprising pressure hydrogenating an alkali metal reactant and aluminum containing a reaction-promoting quantity of a member selected from the group consisting of titanium, zirconium, hafnium, vanadium, niobium, and uranium.

The present invention is also a semi-continuous process for the production of alkali metal aluminum tetrahydride, said process comprising the steps of:

(a) pressure hydrogenating an alkali metal reactant with about a stoichiometric excess of aluminum, said aluminum containing a reaction-promoting quantity of a member selected from the group consisting of titanium, zirconium, hafnium, vanadium, niobium, and uranium;

(b) withdrawing alkali metal aluminum tetrahydride product so as to leave an activated aluminum heel for recycle in a subsequent hydrogenating step;

(c) adding alkali metal reactant and any additional aluminum containing a reaction-promoting quantity of said member required to make a reaction mixture containing a stoichiometric excess of said aluminum; and (d) pressure hydrogenating said reaction mixture and recovering product alkali metal aluminum tetrahydride.

The present invention is also a process for the production of an alkali metal aluminum tetrahydride comprising pressure hydrogenating an alkali metal reactant and aluminum in the presence of an aluminate catalyst formed from sodium aluminum tetrachloride ($NaAlCl_4$).

The present invention is also a semi-continuous process for the production of alkali metal aluminum tetrahydride, said process comprising the steps of:

(a) pressure hydrogenating an alkali metal reactant with about a stoichiometric excess of aluminum in the presence of an aluminate catalyst formed from sodium aluminum tetrachloride ($NaAlCl_4$);

(b) withdrawing alkali metal aluminum tetrahydride product so as to leave an activted aluminum heel for recycle in a subsequent hydrogenating step;

(c) adding alkali metal reactant and any additional aluminum required to make a reaction mixture containing about a stoichiometric excess of aluminum; and (d) pressure hydrogenating said reaction mixture and recovering produce alkali metal aluminum tetrahydride.

The present invention is also a process for the production of an alkali metal aluminum tetrahydride comprising pressure hydrogenating an alkali metal reactant and aluminum in an ether reaction medium in the presence of a catalyst.

This invention is also an active aluminum-containing aluminate liquid heel comprising a major portion of a reaction medium innocuous to pressure hydrogenation of alkali metal reactant and aluminum and a minor portion of an aluminate catalyst species formed by heating an alkali metal reactant, aluminum, and $NaAlCl_4$ at at least about 65° C. under at least about 100 psig hydrogen pressure.

Since the alkali metal aluminum tetrahydride product solution may be readily recovered by decanting it from the powdery aluminum-containing heel, the heel is readily available for reuse as catalyst in subsequent cycles. Thus, the present invention is also a composition of matter comprising an alkali metal aluminum tetrahydride in an innocuous reaction medium also containing an alkali metal aluminate.

DESCRIPTION OF THE PREFERRED EMBODIMENT

A preferred embodiment of the invention is the production of alkali metal aluminum tetrahydrides from alkali metal, aluminum, and hydrogen under pressure at elevated temperature, wherein the aluminum contains a reaction-promoting amount of titanium, zirconium, hafnium, vanadium, niobium, or uranium.

The aluminum for the invention may be in any of several forms, preferably some comminuted form, more preferably a fine powder.

The use of titanium, zirconium, hafnium, vanadium, niobium, or uranium for a synthesis such as this invention has not been recognized heretofore.

A suitable range for the reaction-promoting quantity of metal is about 300–2500 parts by weight per million parts aluminum. A preferred range is 450–2000 ppm. A more preferred range is about 1000–2000 ppm. The reaction of the invention generally proceeds at a faster rate with increased weights of metal. The upper point of diminishing return has not been determined. A valuable and useful aluminum powder is sold under the trade designation I-783 by Reynolds.

The titanium or other listed metal is preferably present in the aluminum as an alloy. Notably, addition of titanate esters are not very effective for the invention. Other forms may well be advantageous.

Titanium and zirconium are preferred because of their availability but uranium may be preferred where a waste source or other supply is readily available. Other similar metals may prove to be equivalent for the invention.

In another embodiment, any aluminum, whether containing higher amounts of other metals or not is reacted with alkali metal and hydrogen in the presence of sodium aluminum tetrachloride, $NaAlCl_4$. The $NaAlCl_4$ forms a catalyst species especially favored for good reaction rate as measured by hydrogen uptake.

In another embodiment using any aluminum, an alkali metal (preferably sodium) is pressure hydrogenated with the aluminum in the presence of a catalyst all in an ether solvent. The ether solvents tend to hold the product alkali metal aluminum tetrahydride in suspension permitting use of the product material in a subsequent reaction without separation, centrifugation, or other recovery procedure. For example, product alkali metal aluminum tetrahydride (preferably sodium aluminum tetrahydride) may remain in an ether such as diglyme and be reacted with silicon tetrachloride, silicon tetrabromide, silicon tetrafluoride or other silicon containing reactant to produce silane in an advantageous manner.

In a more preferred embodiment, the aluminum and alkali metal are present in substantially stoichiometric proportions. Since the pressure hydrogenation reaction converts essentially all of the reactants to alkali metal aluminum tetrahydride product on completion, the ether composition is in quite pure product form for subsequent reactions. The need for a settling or decanting period is obviated since no aluminum-containing heel remains. While some catalyst contamination may appear in the product/ether mixture, this can be minimized where alkali metal and/or aluminum are elements of the catalyst source material. This is accomplished by considering the amount of aluminum and/or alkali metal present in the catalyst when calculating the total amount of reactants to be used. Examples of such catalyst sources for this purpose are $NaAlCl_4$, $NaAlF_4$, $AlCl_3$. In a still more preferred delineation of this embodiment, $NaAlCl_4$ is the catalyst sources, giving very little contamination with chloride. $AlCl_3$ and other aluminum halides also give good results.

The decant period required to remove a heel for subsequent runs is often one hour or more. The stoichiometric embodiment eliminates that period where desired. Also fresh catalyst may then be used for subsequent reactions, when desired.

Monoglyme, diglyme, and the like are preferred mediums for reaction since they are broadly usable in subsequent reactions. Also usable are mixtures of various ethers, preferably glymes or THF with hydrocarbons. Conventional hydrocarbon solvents such as toluene, pentane, hexane, heptane and the like are suitable. Toluene is preferred. A mixture of toluene and diglyme is preferred under many reaction conditions.

The alkali metals usable with the invention include sodium, lithium, and potassium. Sodium is preferred for its availability and cost.

The process is best carried out in an innocuous liquid reaction medium. By innocuous, I mean one which does not interfere with the inventive process. The reaction medium may be selected from a broad range of materials. The reaction mediums may be hydrocarbons, ether-type solvents including polyethers and cyclic ethers.

More preferred are the diloweralkyl ethers of alkylene glycols such as the dimethyl ethers of ethylene glycol (monoglyme), the dimethyl ether of propylene glycol, the dimethyl ether of diethylene glycol (diglyme), the dimethyl ether of triethylene glycol (triglyme), the diethyl ether of ethylene glycol, and the like. Most preferred are diglyme and monoglyme, especially diglyme.

The reaction is a pressure hydrogenation at at least about 100 psig up to about 5000 psig. A preferred range is about 750–2000 psig. More preferred is 1000–2000 psig. The most preferred pressure range depends upon materials of construction and reactants/products.

The reaction will proceed at relatively low temperature but an elevated temperature is preferred. A suitable range is about 65°–300° C. depending upon reactants and reaction medium. A preferred range is 100°–200° C. and a more preferred range is 120°–170° C. The most preferred temperature range depends upon choice of reactants and medium as well as materials of construction for the reactor. About 140°–160° C. is usually most preferred.

The reaction is carried out so that product alkali metal aluminum tetrahydride is readily recovered. A suitable range of weight percent product tetrahydride in reaction medium is about 5–20 percent. A preferred range is 10–15 weight percent.

A catalyst is preferably used in the inventive process. The catalysts may be added or formed in situ, normally in a first reactive period or induction period. The catalysts found most suitable for this invention are alkali metal aluminate compounds. These catalysts include those formed from sodium aluminum tetrahydride, sodium aluminum tetrachloride, sodium aluminum tetrafluoride, lithium aluminum tetrahydride, lithium aluminum tetrachloride, lithium aluminum tetrafluoride, potassium aluminum tetrafluoride, and aluminate compounds formed from lower alcohols and organoaluminums especially aluminum alkyls. These include alkali metal aluminates of structure I:

$$MAl[O(R_1{-}O)_mR_2]_nH_{4-n} \qquad (I)$$

wherein M is an alkali metal, $R_2$ is alkyl, $R_1$ is alkylene, m is zero or greater, and n is one to four. The aluminates of structure I include $NaAl(OCH_2CH_2OCH_3)_2H_2$ (vitride) and $NaAl[OCH(CH_3)]_2H_2$. Examples of those formed from aluminum alkyls are $NaAl(CH_2CH_3)_2H_2$.

The alkali metal aluminates of structure I, the alkali metal aluminum tetrahalides, and the alkali metal aluminum tetrahydrides are preferred. A preferred aluminum alkyl is triisobutyl aluminum. $NaAlCl_4$ is the most preferred catalyst source material. $NaAlCl_4$, like the other catalyst source materials above forms an aluminate catalyst species during the induction period of the inventive process. However, $NaAlCl_4$ provides an active heel for use in subsequent steps which maintains its activity at a very high rate for a long period despite substantially rapid and complete loss of the chlorine content in the heel. Like the other catalysts, $NaAlCl_4$ provides an active aluminate heel which in turn provides immediate hydrogenation reaction without an induction period in successive hydrogenations.

The catalysts are present in about 3–15 mole percent on sodium. The reaction is preferably run with sodium as the limiting reactant. Because of extremely good reactivity of the catalyst formed from $NaAlCl_4$, even less than about three (3) mole percent may be used. For commercial scale reactions about two mole percent is advisable, although as little as about one (1) mole percent may be used.

The reaction is preferably run on a semi-continuous or cyclic basis with a reactive aluminum-containing heel or solid residue being carried through for successive cycles. All indications are that the cycles may be continued indefinitely without depletion of activating aluminum-containing material in the heel.

In a preferred embodiment, $NaAlCl_4$ (soluble in most ethers including diglyme) is used as the catalyst source material. The reaction mixture is heated with excess aluminum during an induction period which forms the catalyst species and, preferably, immediately reacted to form alkali metal aluminum tetrahydride product. The generated active, aluminum-containing heel is reused with new portions of reactants as required. Analysis for chlorine indicates that greater than 90% of the soluble chlorine has been converted to another form, probably NaCl. Despite substantial depletion of the original catalyst source, the hydrogen consumption rate remains consistently high in successive reactions using this active heel. This is surprising since it was anticipated that the rates would eventually fall to those observed for heels prepared using the other catalysts.

The invention is also a composition of matter formed from the reaction and from which valuable, useful product mixtures/solutions may be decanted. The sodium aluminum tetrahydride solutions are preferred compositions.

According to the invention, the first cycle in the semi-continuous process for preparation of an alkali metal aluminum tetrahydride solution includes activation by catalytic species of the aluminum powder.

The aluminum is preferably present in a stoichiometric excess of, e.g., sodium present. The excess is preferably such that the gram-atom ratio of aluminum to sodium is at least about 2:1, more preferably about 3:1 or more. My experiments have shown that when a 1:1 ratio is used, even when a catalytic species is added (rather than formed in situ), the reaction rate is generally only about 40 to 60% of the reaction rate, depending on catalyst concentration, of a 2:1 ratio of aluminum to sodium.

Of course, where a catalytic species of alkali metal aluminate is formed in situ, one must provide enough reactants for both catalyst formation and reaction. In subsequent steps of the cyclic process, as where aluminum and sodium or other alkali metal are depleted and then replenished, I have found it suitable to add about 1.1 gram-atom parts aluminum per gram-atom part sodium. Some aluminum is lost as fines in the decanted product, especially where good settling time is not permitted.

The in situ catalyst activation (formation of alkali metal aluminate) is accomplished by adding a catalyst source material such as triisobutyl aluminum to the liquid reaction medium, preferably after addition of the sodium or other alkali metal to the medium, preferably diglyme. The reaction mixture is then pressure hydrogenated, preferably at at least about 750 psig and elevated temperature, preferably about 120°–160° C.

When the hydrogen take-up is complete or significantly slow, the product solution is cooled. The product alkali metal aluminum tetrahydride in liquid reaction medium is carefully decanted leaving an active aluminum-containing heel for subseuent cyclic steps.

With proper decantation techniques, the active heel should last indefinitely. This heel has been recovered after five cycles in a process making sodium aluminum tetrahydride. Settling tests have indicated nearly complete settling of residual aluminum after 5–10 minutes at 85° C.

According to a preferred embodiment of the invention, after activation, the reaction of sodium, aluminum containing 1900 ppm titanium, and hydrogen at 1000 psi and 140° C. results in 75 percent conversion after only fifty minutes.

The following Examples serve to further illustrate the invention.

EXAMPLE 1

The reaction vessel used was a 300 ml stainless steel autoclave with a single, magnetically driven stirrer (used at 600 rpm's). The reactor was equipped with an external heater, an internal thermocouple, and an internal cooling coil to maintain a narrow range for the reaction temperature of the exothermic reaction. To the autoclave was charged 8.0 grams sodium (0.321 mole after correction for catalyst formation), 9.6 grams (0.356 mole) aluminum powder containing 1900 parts by weight titanium per million parts aluminum, 5 ml triethyl aluminum (10.5 mole percent based on Na), and 110 ml toluene. The reactor was purged with hydrogen, pressure tested, heated to 140° C., and pressurized with hydrogen to 2000 psig. After an induction period of about thirty minutes, the reaction was essentially complete after 2.5 hours. The vessel was cooled and vented and the solid product was collected by filtration. The product was washed with toluene and pentane, then dried in vacuum. The yield was 20.2 grams of grey solids. For analysis, a 7.2 gram portion of product was extracted with diglyme until a total of 100 ml extract was obtained. Analysis disclosed 1.13 millimoles aluminum per ml, 4.05 millimoles gas per ml. This is a yield of about 101.2% based on aluminum analysis and about 90.7% by gas analysis.

EXAMPLE 2

The general procedure of Example 1 was followed except that the reaction mixture was heated at 160° C. for four hours and then 140° C. for about four and one-half hours. The yield was 94.3 percent on aluminum analysis.

By comparison, the procedure of this example at 160° C. entirely with aluminum containing 180 ppm titanium provided a yield of only 67.2 percent on aluminum after eight hours. Similar runs using aluminum with 1900 ppm titanium but using preformed sodium aluminum diethyl dihydride catalyst at only 4 mole percent on sodium at 1650° C. gave only 17 percent yield after six and one-quarter hours. A like run at 200° C. for three hours and 160° C. for two hours provided only a 20.9% yield.

EXAMPLE 3

The same general procedure was followed as in Example 1 except that a polyether solvent reaction medium was used. To the reactor was charged 8.0 grams (0.348 mole) sodium, 35 grams (1.296 moles) aluminum powder containing 1900 ppm titanium, 110 ml diglyme and enough triisobutyl aluminum to make up 6.5 mole percent on sodium. The vessel was purged, pressure tested, heated to 140° C. and pressurized to 1000 psig with hydrogen. After a 50 minute induction period, the reaction was allowed to proceed until no further hydrogen uptake was observed (about 70 additional minutes). The product solution was recovered as usual.

EXAMPLE 4

An active aluminum containing heel from an earlier run using triethyl aluminum in diglyme was in the reaction vessel described in Example 1. To the heel was added 7.2 grams (0.313 mole) sodium, 9.3 grams (0.344 mole) aluminum containing 1900 ppm titanium and 110 ml solvent diglyme. The mixture was pressure reacted with hydrogen at 1000 psig and 140° C. until hydrogen uptake ceased in about three and one-half hours. The vessel was cooled, vented, and the heel recovered as a decant. A diglyme wash of the heel was added to the decant. The decant was filtered through a medium porosity frit backed by three-eights inch Celite. A total of 197.5 grams solution was obtained. Analysis of sample of the solution indicated 4.00% aluminum and 6.40 millimoles per gram gas. The yield was calculated at 97.5 percent. The heel was successfully used in four successive runs with yields at about 100 percent.

EXAMPLE 5

An active heel from an earlier run using aluminum with 500 ppm titanium and triisobutyl aluminum catalysts was in the reactor. To this heel was added 0.313 mole sodium, 0.344 mole aluminum powder containing 450 ppm titanium and 100 ml diglyme. The mixture was pressure hydrogenated at 1000 psig and 140° C. until the hydrogen consumption was calculated to be about 65% conversion on sodium. The vessel was quickly cooled and vented and the product solution decanted. Subsequent charges to the active heel are shown in the table below. In each case, except the last, the reaction was permitted to proceed to about 65% conversion. The last run was carried to completion (about three and one-half hours).

TABLE

| | Short Cycle Series | | |
|---|---|---|---|
| Run | Moles Na | Moles Al | Time (min.) |
| 1 | 0.313 | 0.344 | 118 |
| 2 | 0.187 | 0.205 | 146 |
| 3 | 0.226 | 0.248 | 156 |
| 4 | 0.226 | 0.248 | 210 |
| Total | 0.952 | 1.005 | |

The product solutions were combined and analyzed for an overall yield of about 100%.

Several other reactions were carried out to confirm that higher reaction rates were achieved with higher content of titanium in the aluminum.

The sodium aluminum tetrahydride served as a very good catalytic aluminate while conventional organoaluminums such as triethyl aluminum were not as effective as the sodium aluminum tetrahalides or the sodium aluminum dialkyl dihydrides. Isopropyl alcohol and triisobutyl aluminum proved to be sources of good catalytic species. Also, the dimethyl ether of diethylene glycol and the dimethyl ether of ethylene glycol proved to be highly preferred as compared to the dimethyl ether of triethylene glycol.

The reaction did not proceed with an alkaline earth metal hydride (magnesium hydride) rather than an alkali metal.

Notably, the alkylated catalysts may be disfavored where production of silicon (silane) is envisioned for the tetrahydride.

EXAMPLE 6

This example demonstrates operation of the invention on a larger scale. A five gallon autoclave was purged and pressure tested with nitrogen. The autoclave was equipped with heater and mechanical stirrer. A dipleg extended into the autoclave to a point just three inches above the bottom of the autoclave (where the heel settles). To the vessel was charged 21.9 pounds (9930 grams, about 2.9 gallons) diglyme, 3.86 pounds (1752 grams) sodium aluminum hydride catalyst, 1.64 pounds (746 grams) sodium, and 4.82 pounds (2187 grams) aluminum powder containing 1900 ppm titanium. The vessel was sealed and pressurized to 1000 psig hydrogen at 140° C. with agitation. The reaction was allowed to proceed until hydrogen consumption ceased, about three and one-half hours. The vessel and ingredients were cooled to ambient without agitation in about one hour. About 22.5 pounds of the product was discharged to a nitrogen-purged storage vessel.

Two subseuent runs were produced using the active heel from above and the product was deposited in the storage vessel. In these two runs, 14.0 pounds (6360 grams) diglyme, 1.64 pounds (746 grams) sodium, and 2.12 pounds (963 grams) aluminum with 1900 ppm titanium were charged. The subsequent runs discharged 17.5 pounds and 18.5 pounds product, respectively.

The following examples demonstrate preferred embodiments using both high-titanium aluminum and my best catalyst source $NaAlCl_4$. The $NaAlCl_4$ has proven to both activate the aluminum powder and provide catalyst for the hydrogenation reaction. The induction period is quite short and the hydrogen uptake is about twice as fast as with other catalysts I discovered.

EXAMPLE 7

To a reaction vessel was charged 4.9 grams (0.0255 mole) $NaAlCl_4$, 35 grams (1.297 gram-atoms) aluminum containing 1900 ppm titanium, 10.3 grams (0.448 gram-atom) sodium, and 110 ml, dry diglyme. The mixture was pressurized with hydrogen to 1000 psig at 140° C. The hydrogen uptake, after an induction period of a few minutes, was rapid with the reaction essentially completed after 40 minutes. The product solution was decanted and the heel retained. The filtered decant yielded 116 grams solution. Analysis showed that less than 10% of the chlorine value charged was present. The conversion on sodium was 84.7%, discounting a small portion of product remaining in the heel.

The heel was reacted with an additional 7.2 grams (0.313 gram-atom) sodium, 9.3 grams (0.345 gram-atom) aluminum with 1900 ppm titanium and 100 ml fresh dry diglyme at 140° C. and 1000 psig.

The hydrogen uptake was immediately rapid with a maximum rate of $-34$ psig/min. This compared very favorably with $NaAlH_4$ heels from other catalysts where the maximum rate observed was $-18$ psig/min. The product was separated and the active heel as used in two more successive steps with nearly identical results. The $H_2$ uptake was $-34$ psig/min and $-33$ psig/min. The formed catalyst does not appear to be soluble in a polyether such as diglyme and the reaction rate stays consistently high with this catalyst heel.

EXAMPLE 8

This example demonstrates a stoichiometric embodiment of the invention.

To the reaction vessel was added 1.41 grams $NaAlCl_4$ (0.007 mole) $NaAlCl_4$, 10.9 grams (0.404 gram-atom) aluminum containing 1900 ppm titanium, 9.0 grams (0.391 gram-atom) sodium, and 120 ml dry purified diglyme. The mixture was pressure hydrogenated at 1000 psig and 140° C. The hydrogen uptake reached a maximum rate of $-40$ psig/min after an induction period of about 14 minutes. The total reaction period was about 100 minutes. No decanting was required. The entire reaction mixture was filtered through a medium frit and washed with 20 ml dry diglyme to provide 170.6 grams of product solution. The cake (heel) was washed with 25 ml dimethyl ether and 20 ml pentane and dried briefly under vacuum to provide 6.42 grams moist solids (heel). The yield on sodium was about 92%.

EXAMPLE 8A

This and the next example demonstrate a stoichiometric embodiment with a halide catalyst, carried out in an ether/hydrocarbon mixed reaction medium. To the 300 ml reaction vessel of Example 1 was charged:

8.7 grams sodium (0.348 gram-atom after correction for reaction with catalyst)
   90 ml toluene
   20 ml diglyme
   1.4 grams $AlCl_3$ (0.0105 mole)
   10.3 grams aluminum containing 1900 ppm titanium (0.382 gram-atom)

The reaction mixture was pressure hydrogenated at 2000 psig and 140° C. Including a brief induction period, the hydrogen consumption was complete in 215 minutes. The reaction mixture separated into a solid product phase of $NaAlH_4$, an upper toluene phase, and a lower saturated solution of $NaAlH_4$ in diglyme. The liquid phases were separated. The solids ($NaAlH_4$) were extracted with additional diglyme and combined with the saturated solution of diglyme to provide 148.4 grams solution total. Analysis showed 0.290 mole $NaAlH_4$ product (83.5% yield) and 0.002 mole chloride.

EXAMPLE 8B

The procedure of the preceding example was repeated using:

10.3 grams aluminum containing 1900 ppm titanium (0.382 gram-atom)
   90 ml toluene
   20 ml diglyme
   3.34 grams $NaAlCl_4$ (0.017 mole)
   9.6 grams sodium (0.365 gram-atom after correction for reaction with catalyst)

The total reaction time was 200 minutes and the mixture was worked up as above to provide 163.1 grams total diglyme solution of $NaAlH_4$. Analysis showed 0.314 mole $NaAlH_4$ for 86.0% yield.

EXAMPLE 9

This example shows the reaction rate slowing with a reduced portion of catalyst source material.

The same procedure was followed as in Example 7 with the following change: 11.6 grams (0.430 gram-atom) aluminum with 1900 ppm titanium, 9.0 grams (0.391 gram-atom) sodium, 0.75 gram (0.0039 mole) $NaAlCl_4$, and 120 ml dry diglyme. The maximum hydrogen consumption rate was about $-15.2$ psig/min.

EXAMPLE 10

This example demonstrates the use of $NaAlCl_4$ with aluminum containing only about 450 ppm titanium. Although the reaction rate was not as great, the process is still valuable with aluminum reactants of low other metal content.

To a reaction vessel was charged the same amounts of ingredients as in Example 8 except the lower titanium aluminum was used. The reaction was conducted at 140° C. and 1000 psig. The hydrogen consumption rate was only about $-4.3$ psig/min. The induction period was about 60 minutes and the total reaction time was about nine hours.

While a preferred embodiment of the invention has been described above, it is possible to vary certain aspects of the invention without departing from the scope or spirit thereof. For example, various reaction mediums and various amounts of aluminum may be used. Also, for the catalyst from NaAlCl$_4$, various types of aluminum may be used without departing from the scope or spirit of the invention as defined by the appended claims.

I claim:

1. A process for the production of an alkali metal aluminum tetrahydride comprising pressure hydrogenating stoichiometric proportions of alkali metal reactant and aluminum in an ether reaction medium in the presence of an aluminate catalyst formed by heating an alkali metal aluminum tetrahalide, an aluminum trihalide, or an aluminum alkyl under hydrogen pressure in the presence of alkali metal and aluminum; and forming product alkali metal aluminum tetrahydride wherein the reaction is carried to completion whereby no heel remains to be separated.

2. The process of claim 1 wherein said catalyst is formed from an aluminum trihalide.

3. The process of claim 2 wherein said aluminum trihalide is AlCl$_3$.

4. The process of claim 1 wherein said ether reaction medium is a polyether.

5. The process of claim 4 wherein said polyether is a diloweralkyl ether of an alkylene glycol.

6. The process of claim 5 wherein said diloweralkyl ether of an alkylene glycol is a diloweralkyl ether of an ethylene glycol.

7. The process of claim 6 wherein said diloweralkyl ether of an ethylene glycol is the dimethyl ether of diethylene glycol.

8. The process of claim 1 wherein said ether reaction medium is a mixture of an ether and a hydrocarbon.

9. The process of claim 8 wherein said ether reaction medium is a mixture of toluene and the dimethyl ether of diethylene glycol.

10. The process of claim 9 wherein the ratio of toluene to dimethyl ether of diethylene glycol is about 1:1.

11. The process of claim 1 wherein the alkali metal reactant is sodium.

12. The process of claim 11 wherein said catalyst is formed from AlCl$_3$.

13. The process of claim 12 wherein said ether reaction medium comprises diglyme.

14. The process of claim 13 wherein said ether reaction medium further comprises a hydrocarbon.

15. The process of claim 14 wherein said hydrocarbon is toluene.

* * * * *

UNITED STATES PATENT AND TRADEMARK OFFICE
CERTIFICATE OF CORRECTION

PATENT NO. : 4,529,580
DATED      : JULY 16, 1985
INVENTOR(S) : GUNNER E. NELSON

It is certified that error appears in the above-identified patent and that said Letters Patent is hereby corrected as shown below:

Column 1, line 58, reads "co-pening" and should read -- co-pending --.

Column 2, line 67, reads "activted" and should read -- activated --.

Column 3, line 5, reads "produce" and should read -- product --.

Column 6, line 55, reads "subseuent" and should read -- subsequent --.

Column 9, line 9, reads "subseuent" and should read -- subsequent --.

The term of this patent subsequent to January 7, 2005, has been disclaimed.

Signed and Sealed this

Seventeenth Day of December 1985

[SEAL]

Attest:

DONALD J. QUIGG

Attesting Officer

Commissioner of Patents and Trademarks